(12) United States Patent
Shaik

(10) Patent No.: US 10,928,932 B2
(45) Date of Patent: Feb. 23, 2021

(54) 3D MOUSE FOR COMPUTERS

(71) Applicant: Cheman Shaik, Chicago, IL (US)

(72) Inventor: Cheman Shaik, Chicago, IL (US)

( * ) Notice: Subject to any disclaimer, the term of this patent is extended or adjusted under 35 U.S.C. 154(b) by 110 days.

(21) Appl. No.: 16/692,893

(22) Filed: Nov. 22, 2019

(65) Prior Publication Data

US 2020/0089339 A1    Mar. 19, 2020

(51) Int. Cl.
| | |
|---|---|
| *G06F 3/0354* | (2013.01) |
| *G06F 3/0484* | (2013.01) |
| *G06F 3/0481* | (2013.01) |
| *G06F 3/02* | (2006.01) |
| *G06F 3/0362* | (2013.01) |

(52) U.S. Cl.
CPC ............ *G06F 3/03543* (2013.01); *G06F 3/02* (2013.01); *G06F 3/0362* (2013.01); *G06F 3/04815* (2013.01); *G06F 3/04845* (2013.01)

(58) Field of Classification Search
CPC ........................................................ G06F 3/03
See application file for complete search history.

(56) References Cited

U.S. PATENT DOCUMENTS

| | | | | |
|---|---|---|---|---|
| 5,936,612 A  * | 8/1999 | Wang | ..................... | G06F 3/0312 345/163 |
| 6,111,563 A  * | 8/2000 | Hines | .................. | G06F 3/03543 345/158 |
| 6,164,808 A  * | 12/2000 | Shibata | ................. | G06F 3/0346 345/163 |
| 6,344,846 B1 * | 2/2002 | Hines | ..................... | G06F 3/0312 345/156 |
| 6,466,831 B1 * | 10/2002 | Shibata | ................. | G06F 3/0346 345/163 |
| 7,168,047 B1 * | 1/2007 | Huppi | ................. | G06F 3/03543 345/165 |
| 7,233,318 B1 * | 6/2007 | Farag | .................. | G06F 3/03543 345/163 |

(Continued)

OTHER PUBLICATIONS

X-Mouse Button Control User Guide, Gibbons, 2006.*

(Continued)

*Primary Examiner* — Chad M Dicke
(74) *Attorney, Agent, or Firm* — Walter J. Tencza, Jr.

(57) ABSTRACT

A computer mouse is provided which includes a housing; a lateral vertical wheel attached to the housing and configured to rotate with respect to the housing and in a first plane to control lateral vertical planar rotation of a visual object on a computer screen; a horizontal turn wheel attached to the housing and configured to rotate with respect to the housing and in a second plane which is perpendicular to the first plane to control horizontal planar rotation of the visual object on the computer screen; and a straight vertical turn wheel attached to the housing and configured to rotate with respect to the housing and in a third plane which is perpendicular to the first plane and the second plane to control rotation of the visual object on the computer screen in a direction which appears on the computer screen to be substantially perpendicular to vertical and horizontal directions. The mouse also includes a translational motion control button and resizing motion control button for motion and resizing of the visual object in horizontal, vertical and their perpendicular directions.

18 Claims, 17 Drawing Sheets

(56) References Cited

U.S. PATENT DOCUMENTS

| | | | | |
|---|---|---|---|---|
| 7,821,494 B2* | 10/2010 | Tsai | ............... | G06F 3/03543 345/157 |
| 10,031,637 B2* | 7/2018 | Kang | ............... | G06F 3/0483 |
| 10,095,400 B2* | 10/2018 | Ban | ............... | G16H 30/20 |
| 2002/0060663 A1* | 5/2002 | Wang | ............... | G06F 3/0312 345/156 |
| 2003/0197737 A1* | 10/2003 | Kim | ............... | G06F 16/954 715/781 |
| 2006/0077177 A1* | 4/2006 | Kirtley | ............... | G06F 3/03543 345/163 |
| 2006/0212154 A1* | 9/2006 | Von Schroeter | ... | A61C 13/0004 700/118 |
| 2008/0010616 A1* | 1/2008 | Algreatly | ............... | G06F 3/0346 715/856 |
| 2008/0297478 A1* | 12/2008 | Hotelling | ............... | G06F 21/32 345/163 |
| 2009/0051654 A1* | 2/2009 | Wang | ............... | G06F 3/03543 345/163 |
| 2010/0328215 A1* | 12/2010 | Cheng | ............... | G06F 3/03543 345/163 |
| 2011/0109550 A1* | 5/2011 | Shih | ............... | G06F 3/03543 345/163 |
| 2011/0214063 A1* | 9/2011 | Saul | ............... | G06F 3/0481 715/740 |
| 2013/0050087 A1* | 2/2013 | Tien | ............... | G06F 3/0383 345/166 |
| 2013/0169424 A1* | 7/2013 | Kujawski | ............... | G06F 3/0383 340/407.2 |
| 2013/0328781 A1* | 12/2013 | Pate | ............... | G06F 3/0221 345/168 |
| 2014/0085205 A1* | 3/2014 | Kim | ............... | G05G 9/04 345/163 |

OTHER PUBLICATIONS https://www.youtube.com/watch?v=E9IKFv9nQC0 2019.*
Phoenix Signs, How to use Side Mouse Buttons in Roblox (Strucid), https://www.youtube.com/watch?v=E9IKFv9nQC0 May 19, 2019.*

* cited by examiner

Fig. 11
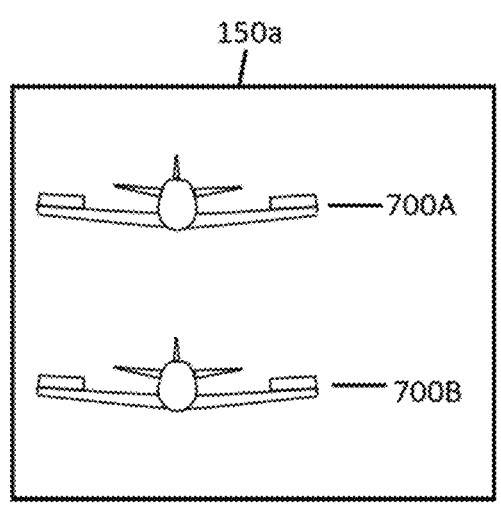
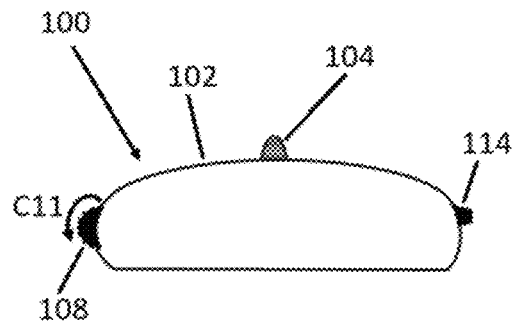

Fig. 12
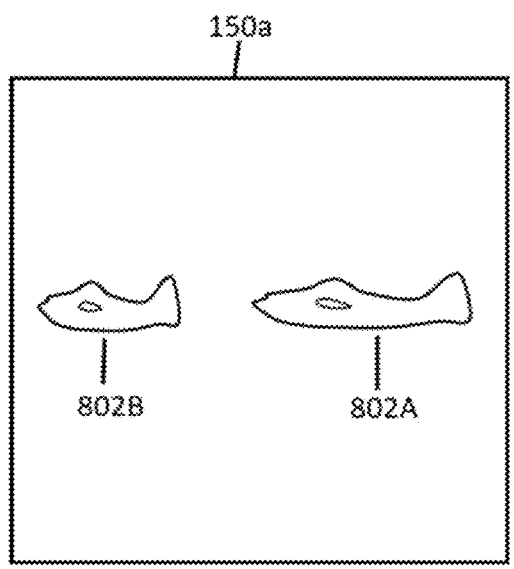
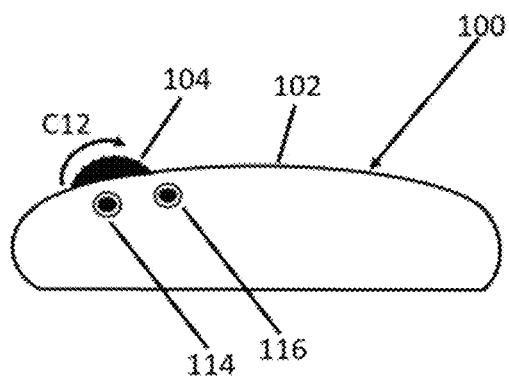

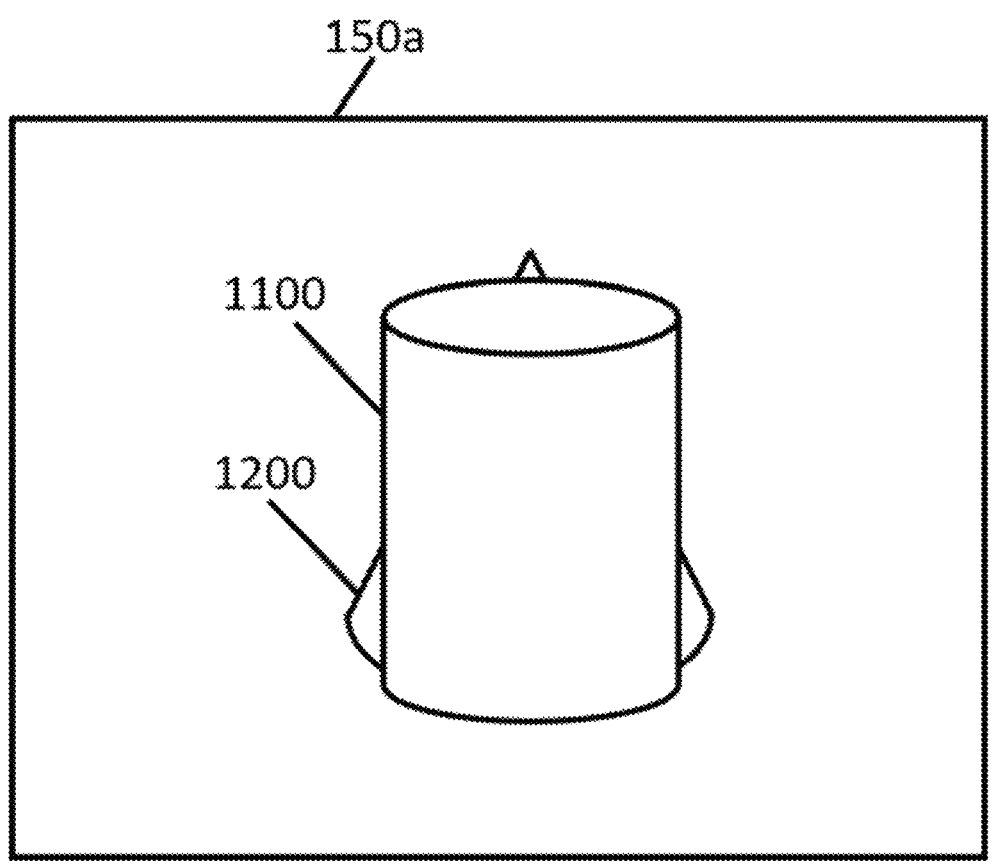

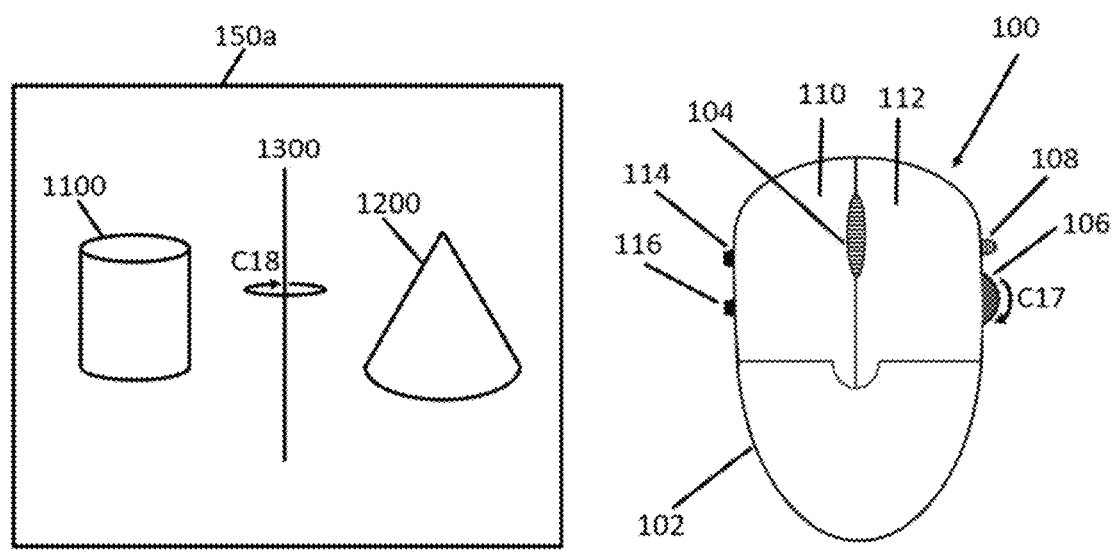

3D MOUSE FOR COMPUTERS

FIELD OF THE INVENTION

This invention relates to mouse devices for computers.

BACKGROUND OF THE INVENTION

A computer mouse is a small hand-held device used to control a computer and do user operations according to its movement on a supporting surface. The first model of a mouse held a ball inside it rolling on a surface for the purpose of detecting motion. Technology advancements introduced an optical mouse which avoids any rolling parts in the mouse. The mouse that we use today is purely a 2D (two dimensional) mouse, that is, we can perform operations in a 2D plane over the computer screen. However, known computer mouses do not allow one to move objects on the screen in a three-dimensional (3D) space.

SUMMARY OF THE INVENTION

One or more embodiments of the present invention relate to a 3D mouse with which a computer user can perform operations in a simulated three-dimensional space on a computer screen of a computer monitor. A computer user can move, rotate and resize objects in a simulated three-dimensional space. The 3D mouse includes additional turn wheels and buttons in order to allow movement in additional degrees of freedom. The 3D mouse of one or more embodiments of the present invention is very useful in gaming and virtual reality applications and three-dimensional simulation software. The 3D mouse, in at least one embodiment, contains at least two more turn wheels on its right side wall—one horizontal and one laterally vertical. The original turn wheel on a top surface of the mouse and the other two turn wheels on the right wall of the mouse control rotation of an object in three different directions. Two additional buttons are provided on the left side wall of the 3D mouse. The first button is called a translational motion control button and the second one a resizing control button. The first button acting together with each one of the three turn wheels controls object movement in three different directions, which may be vertical, horizontal, and a simulated direction, such as by computer software, which appears to be perpendicular to the vertical and horizontal directions on a computer screen The second button acting together with each one of the three turn wheels controls object resizing in three different directions: vertical, horizontal, and a simulated direction which appears to be perpendicular to vertical and horizontal directions on a computer screen. Also, a toggle button is provided on the bottom side of the mouse to toggle between 2D and 3D modes of operation. Apart from these controls the 3D Mouse also includes the two regular click buttons that every 2D Mouse typically includes.

Switching between 2D and 3D mode can also be achieved without the toggle button on the bottom surface of the 3D Mouse. This can be achieved such as by pressing one of the two buttons on the left side and the two click buttons simultaneously. This can be achieved through proper programming in mouse driver computer software. This avoids turning the mouse upside down every time a user wants to switch between 2D and 3D modes.

For easy understanding of the motion of an object, nine components of motion are defined. These include rotation in three mutually perpendicular planes, translational motion in three mutually perpendicular directions, as simulated, and resizing in three mutually perpendicular directions, as simulated. The three planes of rotation are the straight vertical plane, lateral vertical plane and horizontal plane. Assuming that a user's computer monitor screen is perpendicular to his or her eye vision, the straight vertical plane is a plane that runs parallel to a user's eye vision. The lateral vertical plane is a plane that runs across the user's eye vision. The horizontal plane is a plane parallel to the ground. The three directions of translational motion are the straight direction, lateral direction and the vertical direction. The straight direction is a direction that runs parallel to the user's eye vision. The lateral direction is a direction that runs across the user' eye vision. The vertical direction is a direction that runs vertical to the ground. The same directions apply to an objects resizing also.

The straight vertical turn wheel on the top surface of the 3D Mouse, which is also the regular wheel of the normal 2D Mouse, controls rotation of an object in the straight vertical plane, which is simulated. The lateral vertical turn wheel on the right-side surface of the 3D Mouse controls rotation in the lateral vertical plane, which is simulated The horizontal wheel on the right surface of the 3D Mouse controls rotation in the horizontal plane, which is simulated.

The first press button on the left surface and the straight vertical turn wheel on the on the top surface of the 3D Mouse together control translational motion in the straight direction. The first press button on the left surface and the horizontal wheel on the right surface of the 3D Mouse together control translational motion in the lateral direction. The first press button on the left surface and the lateral vertical wheel on the right surface of the 3D Mouse control translational motion in the vertical direction.

The second press button on the left surface and the straight vertical turn wheel on the on the top surface of the 3D Mouse together control resizing in the straight direction. The second press button on the left surface and the horizontal wheel on the right surface of the 3D Mouse together control resizing in the lateral direction. The second press button on the left surface and the lateral vertical wheel on the right surface of the 3D Mouse control resizing in the vertical direction.

With a 3D Mouse the mouse cursor can also be moved in a third direction which appears to be or is simulated by computer software to be perpendicular to the computer monitor screen, or the monitor's depth direction. When there are multiple objects stacked one behind the other in a three-dimensional space, in order to select a particular object in the stack a user needs to move the cursor in the depth direction until the object is reached and then select the object. Cursor movement in the depth direction can be achieved such as by holding the 3D Mouse right click button and rotating the straight vertical turn wheel.

In order to perform any simulated 3D operations on an object on a computer screen, a user should first click on the object following which the required 3D operations can be performed. The operation details of the 3D mouse are described in detail with help of figures in the present application wherein the 3D Mouse and an airplane object are displayed. The figures clearly explain how the air plane object rotates, moves and resizes according to the turn wheel and press button actions of a user. The rotation of an airplane in the straight vertical plane is called "pitch" and the rotation in the lateral vertical plane is called "roll" whereas the rotation in the horizontal plane is called "yaw".

In order to rotate the airplane object on a two dimensional screen which is simulating 3D dimension, such as through computer software stored in computer memory and executed by one or more computer processors, in at least one embodiment, the user only needs to rotate the turn wheels. The turn wheels can rotate in both clockwise and anti-clockwise directions and accordingly the airplane object can be rotated in clockwise and anti-clockwise directions. In order to rotate the airplane object in the straight vertical plane (Pitch), in upward, or take off mode the user needs to turn the straight vertical turn wheel in a clockwise direction. On the other hand, to rotate the airplane object in the straight vertical plane (Pitch), in downward, or landing mode, the user needs to turn the straight vertical turn wheel in an anti-clockwise direction.

In order to rotate the airplane object in the lateral vertical plane about the axis of its main body (roll), in a clockwise direction, the user needs to turn the lateral vertical turn wheel in a clockwise direction. On the other hand, to rotate the airplane object in the lateral vertical plane (roll) in an anti-clockwise direction, the user needs to turn the straight vertical turn wheel in an anti-clockwise direction.

In order to rotate the airplane object in the horizontal plane about the vertical axis in a clockwise direction (yaw), the user needs to turn the horizontal turn wheel in a clockwise direction. On the other hand, to rotate the airplane object in the horizontal plane (yaw) in an anti-clockwise direction, the user needs to turn the horizontal turn wheel in an anti-clockwise direction.

Similarly, a user needs to press the first button on the left surface of the 3D mouse and simultaneously rotate the straight vertical turn wheel in an anti-clockwise direction to move the airplane object forward in a straight direction and in clockwise direction to move it in a backward direction. The clockwise or anti-clockwise rotation of turn wheels is perceived assuming the user views the 3D mouse from its top, left and back sides.

Further, a user needs to press the first button on the left surface of the 3D mouse and simultaneously rotate the horizontal turn wheel in an anti-clockwise direction to move the airplane object in left direction, and in a clockwise direction to move it in the right direction. Similarly, the user needs to press the first press button on the left surface and simultaneously turn the lateral vertical turn wheel in an anti-clockwise direction to move the airplane object in vertical direction upward, and in clockwise direction to move it vertically downward.

Regarding resizing of the airplane object, a user needs to press the second press button on left surface of the 3D mouse and simultaneously turn the straight vertical turn wheel in clockwise direction in order to contract it, and in anti-clockwise direction to expand it, in a straight direction. A user needs to press the second press button on the left surface of the 3D mouse and simultaneously turn the horizontal turn wheel in a clockwise direction in order to expand, and in an anti-clockwise direction to contract it, in a lateral direction. Similarly, a user needs to press the second press button on the left surface of the 3D mouse and simultaneously turn the lateral vertical turn wheel in a clockwise direction in order to contract it, and in an anti-clockwise direction to expand it, in vertical direction.

The new geometric coordinates of the body in motion and resizing with respect to a reference origin in a three directional cartesian coordinate system can be derived by adding the difference of coordinates to the initial coordinates before start of the motion. The difference of the coordinates can be derived based on how much the three turn wheels are rotated for rotation, translational motion, and resizing. The difference of coordinates should be transformed into a difference of pixels on the screen by multiplying with a scaling factor existing between the screen's physical dimensions and the number of pixels fitting therein. All this turn wheels rotation capture logic and coordinates computation logic, in at least one embodiment, is built in to the 3D mouse device driver software and the supporting operating system software, which may be provided to a computer processor and computer memory which may be part of the computer mouse housing and/or may be provided from a computer processor and computer memory, such as a personal computer which communicates with the 3D computer mouse.

In at least one embodiment of the present invention, a computer mouse is provided which includes means for controlling vertical direction movement of a visual object on a computer screen; means for controlling horizontal direction movement of a visual object on a computer screen; and means for controlling movement in a direction on the computer screen, which appears or is simulated such as by computer software stored in computer memory and executed by a computer processor, to be substantially perpendicular to vertical and horizontal directions.

In at least one embodiment, a computer mouse is provided which includes a housing; a lateral vertical wheel attached to the housing and configured to rotate with respect to the housing and in a first plane to control lateral vertical planar rotation of a visual object on a computer screen; a horizontal turn wheel attached to the housing and configured to rotate with respect to the housing and in a second plane which is perpendicular to the first plane to control horizontal planar rotation of the visual object on the computer screen; and a straight vertical turn wheel attached to the housing and configured to rotate with respect to the housing and in a third plane which is perpendicular to the first plane and the second plane to control movement of the visual object on the computer screen in a direction which appears on the computer screen or is simulated such as by computer software to appear on the computer screen, to be substantially perpendicular to vertical and horizontal directions.

In at least one embodiment, the computer mouse further includes a translational motion control button; and wherein holding the translational motion control button down while rotating the lateral vertical wheel is configured to cause the visual object to move from one location to another along a vertical line; wherein holding the translational motion control button down while rotating the horizontal turn wheel is configured to cause the visual object to move from one location to another along a horizontal line, which is perpendicular to the first vertical line; and wherein holding the translational motion control button down while rotating the straight vertical turn wheel is configured to cause the visual object to move from one location to another in a direction which appears on the computer screen, or is simulated by computer software stored in computer memory and executed by one or more computer processors to appear on the screen, to be along a straight line, which appears to be substantially perpendicular to the vertical line and to the horizontal line.

In at least one embodiment of the present invention, the computer mouse includes a resizing motion control button; and wherein holding the resizing motion control button down while rotating the lateral vertical wheel is configured to cause the visual object to expand or contract in size along a vertical line; wherein holding the resizing motion control button down while rotating the horizontal turn wheel is configured to cause the visual object to expand or contract in size along a horizontal line, which is perpendicular to the vertical line; and wherein holding the resizing motion control button down while rotating the straight vertical turn wheel is configured to cause the visual object to expand or contract in size on the computer screen in a manner which appears to be along a straight line; which appears on the computer screen or is simulated to appear by computer software, to be perpendicular to the vertical line and to the horizontal line.

In at least one embodiment a method is provided comprising controlling vertical direction movement of a visual object on a computer screen; controlling horizontal direction movement of a visual object on a computer screen; and controlling movement in a direction on the computer screen, which appears on the computer screen or is simulated by computer software to appear to be substantially perpendicular to vertical and horizontal directions.

In at least one embodiment, a method is provided of rotating a lateral vertical wheel, which is attached to the housing of a computer mouse and configured to rotate with respect to the housing and in a first plane to control lateral vertical planar rotation of a visual object on a computer screen; rotating a horizontal turn wheel, which is attached to the housing of the computer mouse and configured to rotate with respect to the housing and in a second plane which is perpendicular to the first plane to control horizontal planar rotation of the visual object on the computer screen; and rotating a straight vertical turn wheel, which is attached to the housing of the computer mouse and configured to rotate with respect to the housing and in a third plane which is perpendicular to the first plane and the second plane to control rotation of the visual object on the computer screen in a plane which appears on the computer screen to be substantially perpendicular to lateral vertical and horizontal planes.

The method may further include holding a translational motion control button down while rotating the lateral vertical wheel to cause the visual object to move from one location to another along a vertical line; holding the translational motion control button down while rotating the horizontal turn wheel to cause the visual object to move from one location to another along a horizontal line, which is perpendicular to the first vertical line; and holding the translational motion control button down while rotating the straight vertical turn wheel to cause the visual object to move from one location to another in a direction which appears on the computer screen to be along a straight line, which appears to be substantially perpendicular to the vertical line and to the horizontal line.

The method may further include holding a resizing motion control button down while rotating the lateral vertical wheel to cause the visual object to expand or contract in size along a vertical line; holding the resizing motion control button down while rotating the horizontal turn wheel is configured to cause the visual object to expand or contract in size along a horizontal line, which is perpendicular to the vertical line; and holding the resizing motion control button down while rotating the straight vertical turn wheel is configured to cause the visual object to expand or contract in size on the computer screen in a manner which appears to be along a straight line, which appears to be perpendicular to the vertical line and to the horizontal line.

The third dimension or the third direction of the three-dimensional simulated space on the computer monitor or computer screen of the computer monitor will appear to be or be simulated to be exactly perpendicular to the computer monitor screen, if what is displayed on the monitor screen is a straight pictorial view of objects. In this case, objects moving back and forth in the third dimension on the monitor screen seem to be increasing and reducing in size. On the other hand, if what is displayed on the monitor screen is a skewed pictorial view of objects, then objects moving back and forth in the third dimension or direction will appear to be or be simulated to be moving at an angle between the horizontal and vertical directions along with increasing and decreasing in size of the objects.

Further, in at least embodiment of the present invention, a computer mouse is provided which is configured to move, rotate, and/or resize the entire environment of the pictorial view, as a whole, on the computer monitor screen, instead of individual objects on the monitor screen. For instance, if a user wants to move, rotate, or resize a cone completely hidden behind a cylinder on the computer monitor screen, it may not be possible for the user to select the cone before doing any mouse operations. In this case the user may have to rotate the entire environment of the pictorial view about a vertical or horizontal line, or effectively about such a line (meaning the vertical or horizontal line may not be shown on the screen of the computer monitor), in order to bring the cone object into a better view. Environmental translation, rotation and resizing can be performed such as by holding down one or both the side press buttons and one of the click buttons while turning the turn wheels.

In environmental translation all visual objects on the computer screen keep moving in a vertical, horizontal or third dimensional direction depending upon which wheel a user is turning, while all the objects remain stationary to one another. In environmental rotation all objects keep rotating in orbits about a vertical, horizontal or third dimensional direction depending upon which wheel a user is turning, while all the objects remain stationary to one another. In environmental resizing all objects keep moving closer or farther to one another in a vertical, horizontal or third dimensional direction depending upon which wheel a user is turning.

Environmental rotation in a given direction can be performed such as by simultaneously pressing the first press button on the left surface and one of the click buttons while turning a wheel accordingly. Environmental translation in a given direction can be performed such as by simultaneously pressing the second press button on the left surface and one of the click buttons while turning a wheel accordingly. Environmental resizing in a given direction can be performed such as by simultaneously pressing both the press buttons on the left surface and one of the click buttons while turning a wheel accordingly.

BRIEF DESCRIPTION OF THE DRAWINGS

FIG. 11 shows a front view of the 3D mouse of FIG. 1, with a first side button of the 3D mouse of FIG. 1 pressed and an arrow representing rotation of a lateral vertical wheel of the 3D mouse of FIG. 1, which causes an object, which is shown, to appear to move accordingly;

FIG. 12 shows a side view of the 3D mouse of FIG. 1 with a second side button of the 3D mouse of FIG. 1 pressed and an arrow representing rotation of a straight vertical turn wheel of the 3D mouse of FIG. 1, which causes an object to be resized accordingly;

FIG. 16 shows a front view of a cone hidden behind a cylinder in an environment; and FIG. 17 shows a top view of the 3D mouse of FIG. 1, with a first side button of the 3D mouse of FIG. 1, pressed and with a first left click button pressed and an arrow representing rotation of a horizontal wheel of the 3D mouse of FIG. 1, which causes an environment of two objects, which is shown, to rotate accordingly about a vertical line.

DETAILED DESCRIPTION OF THE DRAWINGS

Figure 1:
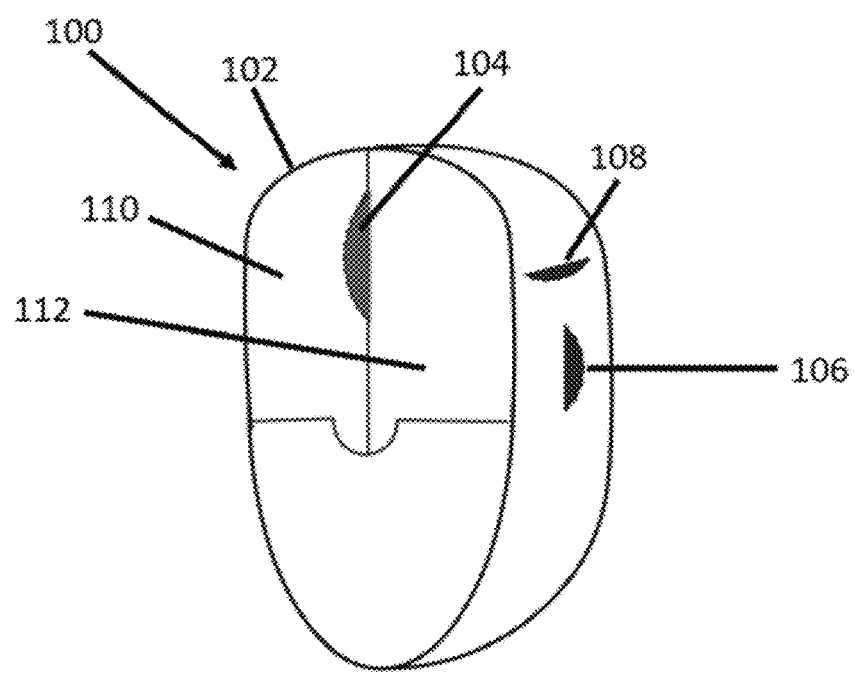
FIG. 1 shows a top right perspective view of a 3D mouse in accordance with an embodiment of the present invention, with three turn wheels visible.

FIG. 1 shows a top right perspective view of a 3D (three dimensional) computer mouse 100 for use in accordance with an embodiment of the present invention. The 3D mouse 100 includes a mouse body or housing 102. The 3D mouse 100 may include straight vertical turn wheel 104, which may be a regular wheel present in all 2D (two dimensional) computer mice, a horizontal turn wheel 106, a lateral turn wheel 108, a regular left click button 110, and a right click button 112. The right click button 112 is typically on a top of the 3D mouse 100. The lateral turn wheel 108 is typically on a right side surface of the 3D computer mouse 100.

Figure 2:
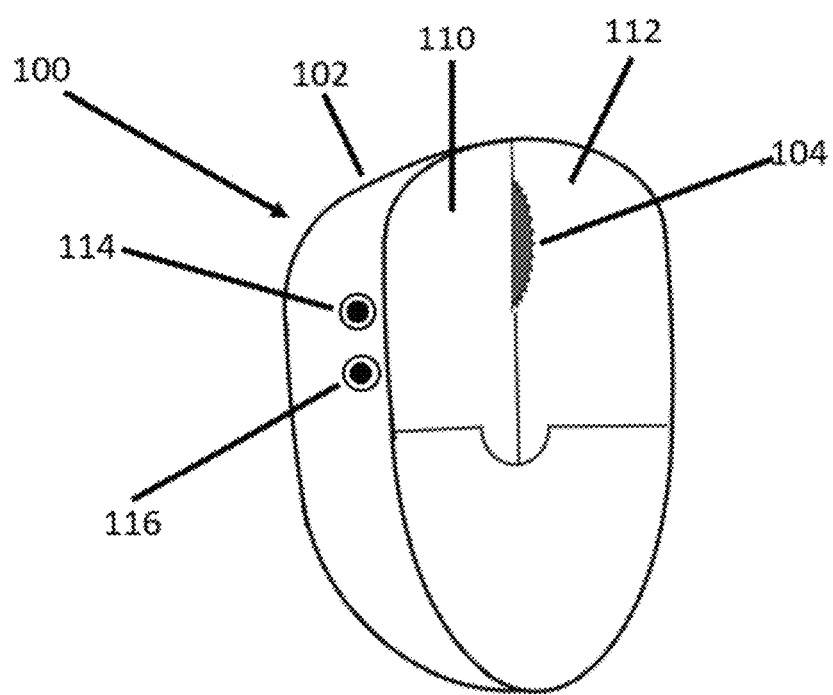
FIG. 2 shows a top left perspective view of the 3D mouse of FIG. 1, with one of the three turn wheels and two press buttons visible.

FIG. 2 shows a top left perspective view of the 3D computer mouse 100. The 3D computer mouse 100 may further comprise a translational motion control Button 114 and a resizing control button 116 on a left surface of the 3D computer mouse 100.

Figure 3:
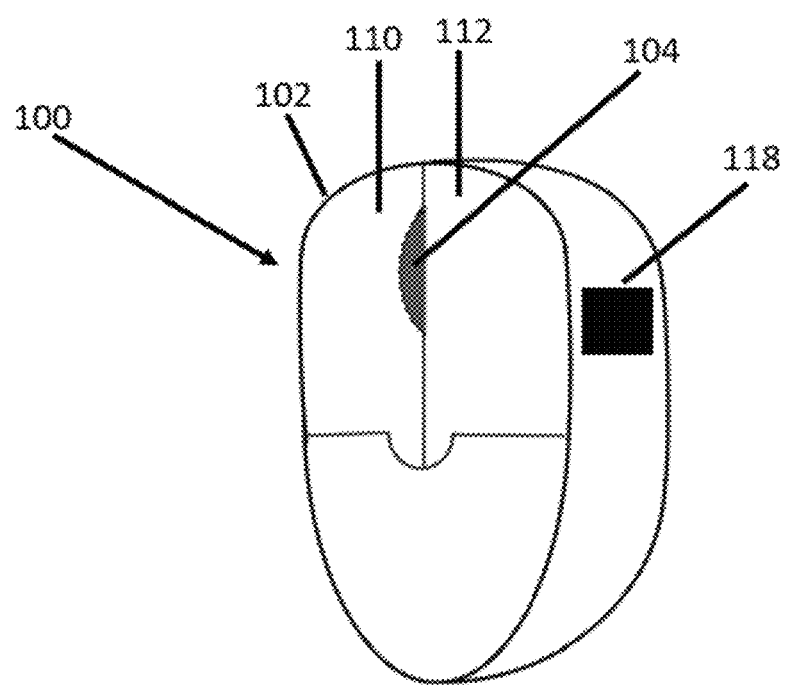
FIG. 3 shows a top right perspective view of the 3D mouse of FIG. 1, with one of the three turn wheels and a finger pad visible.

FIG. 3 shows a top right perspective of the 3D computer mouse 100. The 3D computer mouse 100 may comprise a straight vertical turn wheel 104 which is typically a regular wheel present in all 2D computer mice, and a right finger pad 118 on a right surface of the 3D computer mouse 100.

Figure 4:
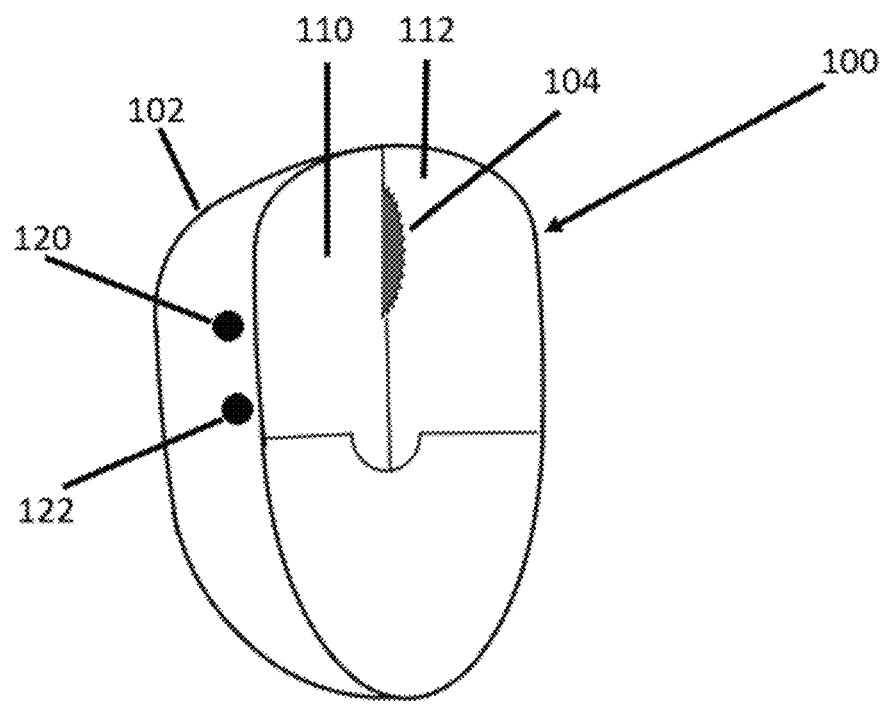
FIG. 4 shows a top left perspective view of the 3D mouse of FIG. 1, with one of the three turn wheels and with two touch pads visible.

FIG. 4 shows a top left perspective view of the 3D computer mouse 100. The 3D computer mouse 100 may comprise a translational motion control finger pad 120 and a resizing control finger pad 122 on a left surface of the 3D computer mouse 100.

Figure 5:
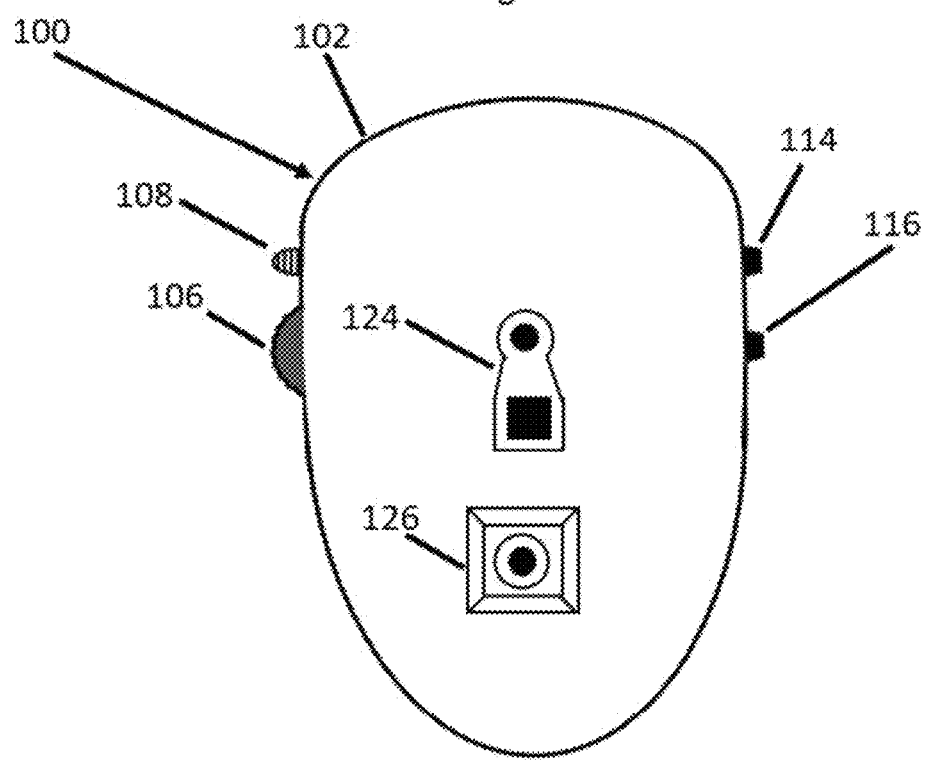
FIG. 5 shows a bottom view of the 3D mouse of FIG. 1.

FIG. 5 shows a bottom view of the 3D computer mouse 100. The 3D computer mouse 100 may include an optical sensor 124 and a 2D/3D toggle button 126.

Figure 6:
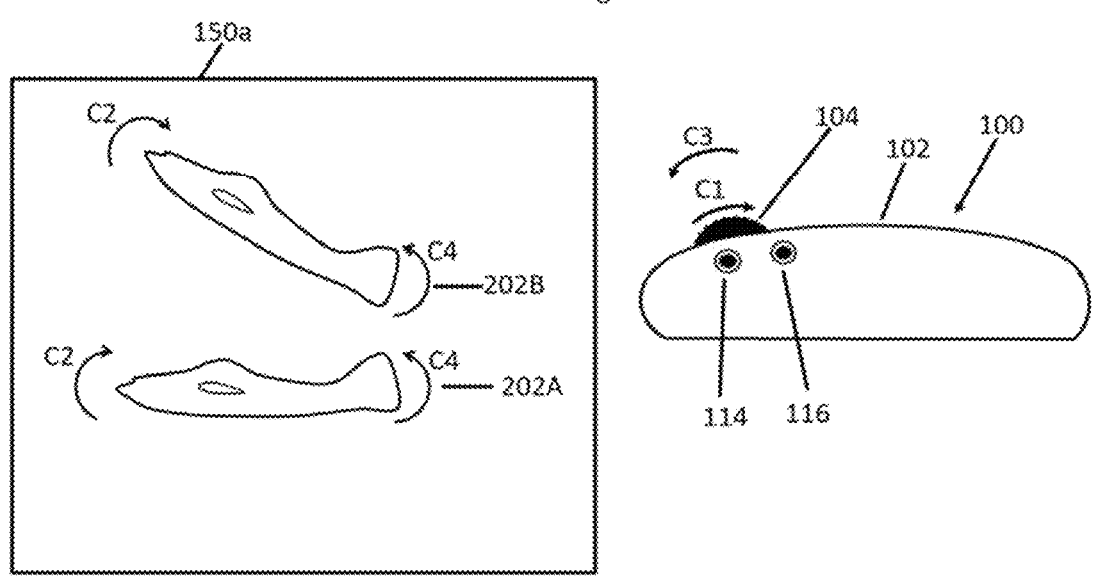
FIG. 6 shows a side view of the 3D mouse of FIG. 1, with an arrow representing rotation of the 3D mouse's straight vertical turn wheel which causes an object, which is shown, to appear to rotate accordingly.

FIG. 6 shows a left view of the 3D mouse 100. The 3D computer mouse 100 may include the straight vertical turn Wheel 104, as shown in FIG. 6. FIG. 6 also shows side views of the same airplane object in two different inclinations 202A and 202B in the straight vertical plane. As a user turns the straight vertical turn wheel 104 in clockwise C1 direction, the same airplane object keeps rotating in clockwise C2 direction in the straight vertical plane at the same height about its geometric centre. On the other hand, if a user turns the straight vertical turn wheel 104 in anti-clockwise C3 direction, the same airplane object keeps rotating in anti-clockwise C4 direction in the straight vertical plane at the same height about its geometric centre. FIG. 6 may be described as showing a change in "pitch" for the plane from orientation 202A to 202B.

Figure 7:
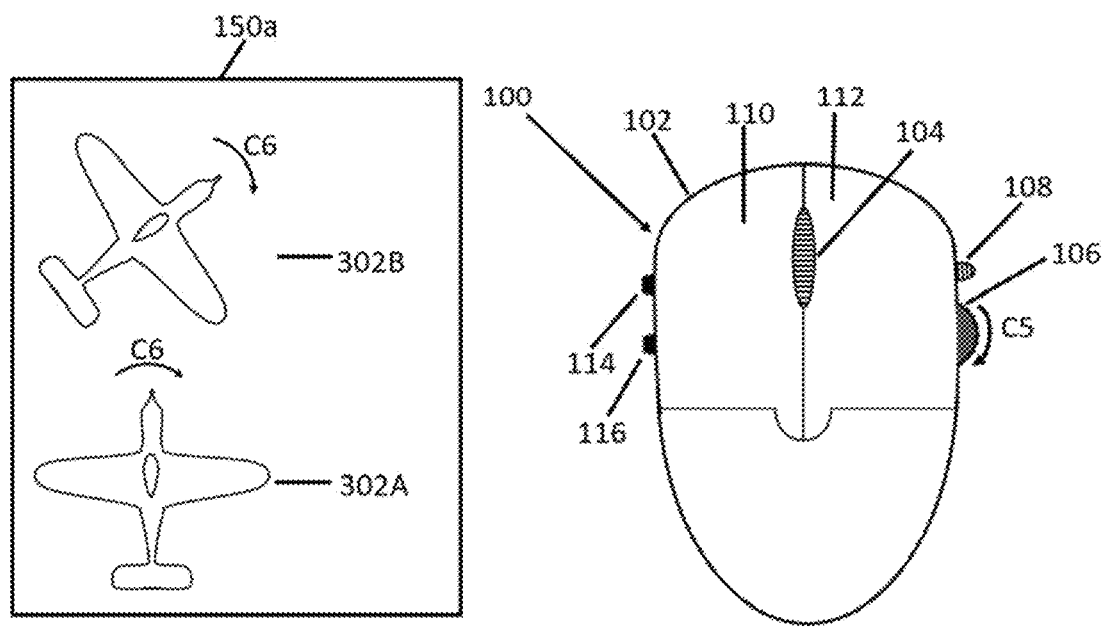
FIG. 7 shows a top view of the 3D mouse of FIG. 1 with an arrow representing rotation of a horizontal wheel of the 3D mouse of FIG. 1, which causes an object, which is shown, to appear to rotate accordingly.

FIG. 7 shows a top view of the 3D computer mouse 100 which may comprise the horizontal turn wheel 106. FIG. 7 also shows top views of the same airplane object at two different orientations 302A and 302B in the horizontal plane. As a user turns the horizontal turn wheel 106 in a clockwise C5 direction, the same airplane object keeps rotating in clockwise C6 direction in the horizontal plane at the same height about its geometric centre, such as from the orientation shown in 302A to the orientation 302B. On the other hand, if a user turns the horizontal turn wheel 104 in anti-clockwise direction, opposite to C5, the same airplane object keeps rotating in anti-clockwise direction, opposite to C6, in the horizontal plane at the same height about its geometric centre. FIG. 7 may be described as showing a change in "yaw" for the plane from orientation 302A to 302B.

Figure 8:
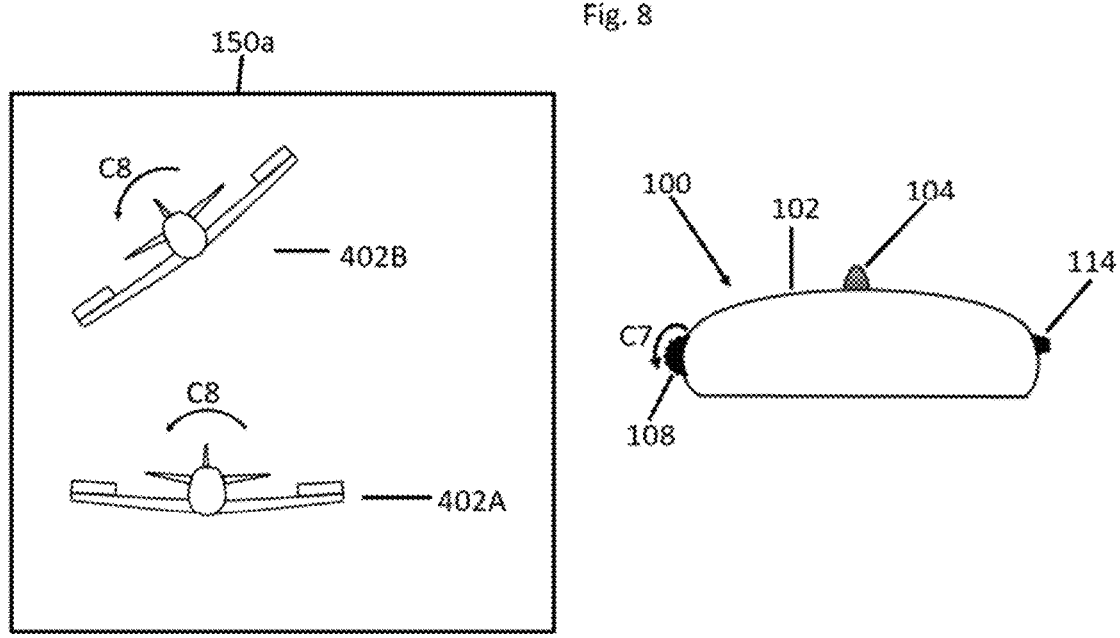
FIG. 8 shows a front view of the 3D mouse of FIG. 1 with an arrow representing rotation of a lateral vertical wheel of the 3D mouse of FIG. 1, which causes an object, which is shown to appear to rotate accordingly.

FIG. 8 shows a front view of the 3D computer mouse 100 which may comprise the lateral vertical wheel 108. FIG. 8 also shows front views of the same airplane object at two orientations 402A and 402B in the lateral vertical plane at the same height. As a user rotates the lateral vertical wheel 108 in a clockwise C7 direction, the air plane object keeps rotating in a clockwise C8 direction in the lateral vertical plane at the same height about its geometric center. FIG. 8 may be described as showing a change in "roll" for the plane from orientation 402A to 402B.

Figure 9:
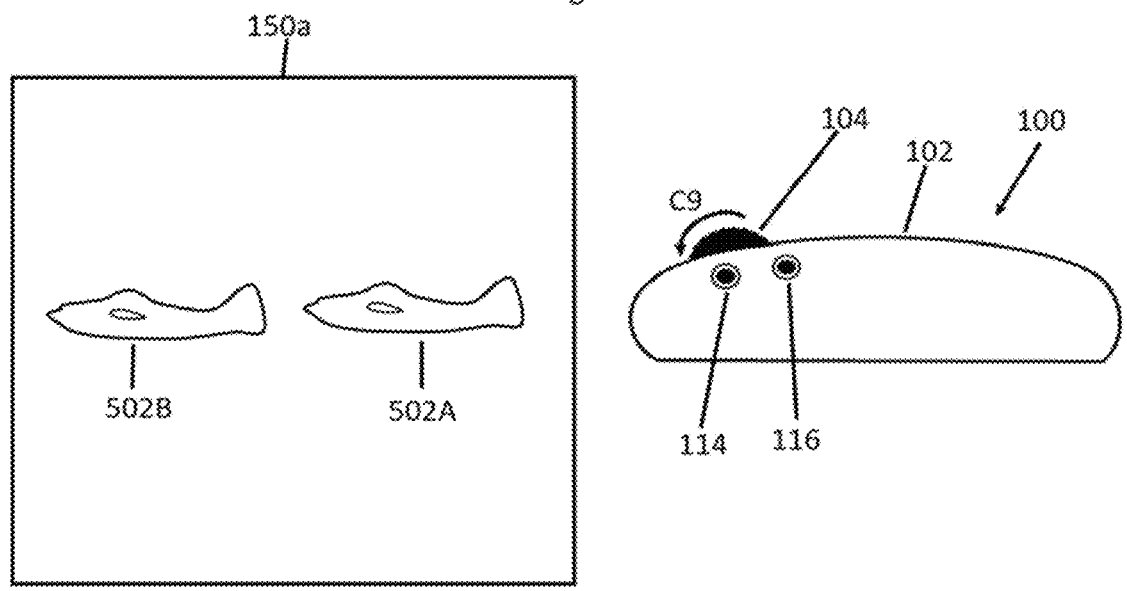
FIG. 9 shows a side view of the 3D mouse of FIG. 1 when a first side button of the 3D mouse of FIG. 1 is pressed and shows an arrow to represent rotation of a straight vertical turn wheel of the 3D mouse of FIG. 1, which causes an object shown in FIG. 9 to move accordingly.

FIG. 9 shows a left view of the 3D computer mouse 100 which may comprise the straight vertical turn wheel 104, the translational motion control button 114 and side views of the same airplane object at two different locations 502A and 502B in a straight line in the straight direction. As a user presses the translational motion control button 114 and simultaneously turns the straight vertical turn wheel 104 in anti-clockwise C9 direction, the same airplane object keeps moving forward in the straight direction at the same height from the location 502A to the location 502B. On the other hand, as a user presses the translational motion control button 114 and simultaneously turns the straight vertical turn wheel 104 in clockwise direction, the same airplane object keeps moving backward, such as from the location 502B to the location 502A, in the straight direction at the same height.

Figure 10:
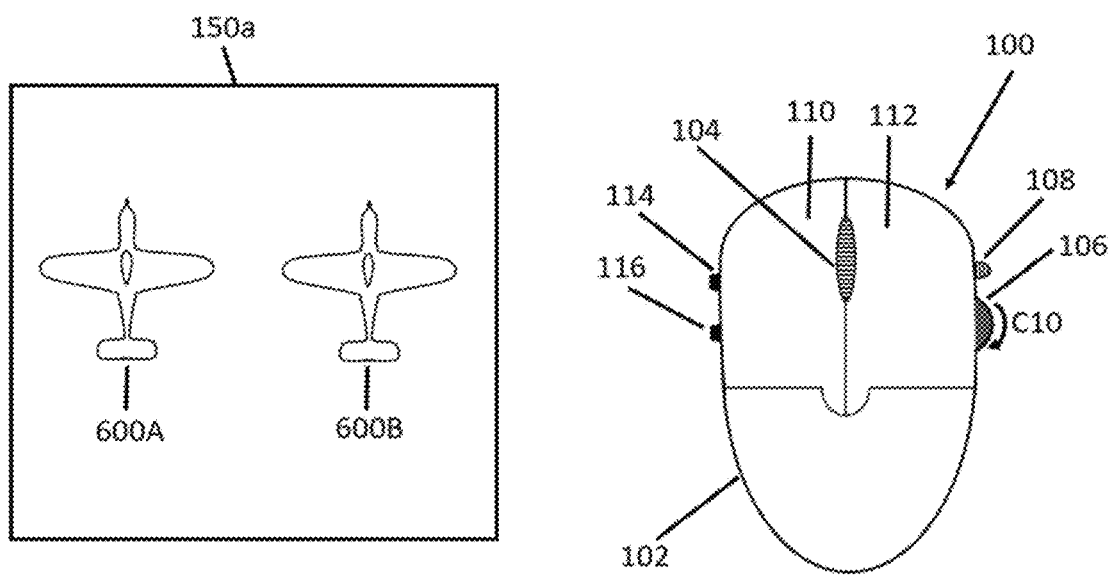
FIG. 10 shows a top view of the 3D mouse of FIG. 1, with a first side button of the 3D mouse of FIG. 1, pressed and an arrow representing rotation of a horizontal wheel of the 3D mouse of FIG. 1, which causes an object, which is shown, to move accordingly.

FIG. 10 shows a top view of the 3D computer mouse 100 which may comprise the horizontal turn wheel 106, and the translational motion control button 114. FIG. 10 also shows top views of the same airplane object at two different locations 600A and 600B in the horizontal plane at the same distance from user's eye. As a user presses the translational motion control button 114 and simultaneously turns the horizontal turn wheel 106 in a clockwise C10 direction, the same airplane object keeps moving laterally in the right direction, such as from position 600A to 600B in the horizontal plane at the same distance from the user's eye. On the other hand, as a user presses the translational motion control button 114 and simultaneously turns the horizontal turn wheel 106 in anti-clockwise direction, opposite C10, the same airplane object keeps moving laterally in the left direction, such as from 600B to 600A, in the horizontal plane at the same distance from the user's eye.

FIG. 11 shows a front view of the 3D computer mouse 100 which may comprise the lateral vertical wheel 108, the translational motion control button 114 and the front views of the same airplane object at two heights 700A and 700B in the lateral vertical plane at the same distance from the user's eye. As a user presses the translational motion control button 114 and simultaneously rotates the lateral vertical wheel 108 in anti-clockwise C11 direction, the air plane object keeps moving up in the lateral vertical plane in a vertical line, such as from 700B to 700A. On the other hand, as a user presses the translational motion control button 114 and simultaneously rotates the lateral vertical wheel 108 in clockwise direction, the air plane object keeps moving in down, such as from 700A to 700B, in the lateral vertical plane in a vertical line.

FIG. 12 shows a left view of the 3D computer mouse 100 which may comprise the straight vertical turn wheel 104, the resizing motion control button 116. FIG. 12 also shows side views of an airplane object in two different sizes 802 and 802B at the same location. As a user presses the resizing motion control button 116 and simultaneously turns the straight vertical turn wheel 104 in clockwise C12 direction, the same airplane object keeps contracting, such as from 802A to 802B in the straight direction while remaining at the same location, or substantially the same location, such as with respect to its center of geometry. On the other hand, as a user presses the resizing motion control button 116 and simultaneously turns the straight vertical turn wheel 116 in anti-clockwise direction, the same airplane object keeps expanding, such as from 802B to 802A, in the straight direction while remaining at the same location, or substantially the same location, with respect to its center of geometry.

Figure 13:
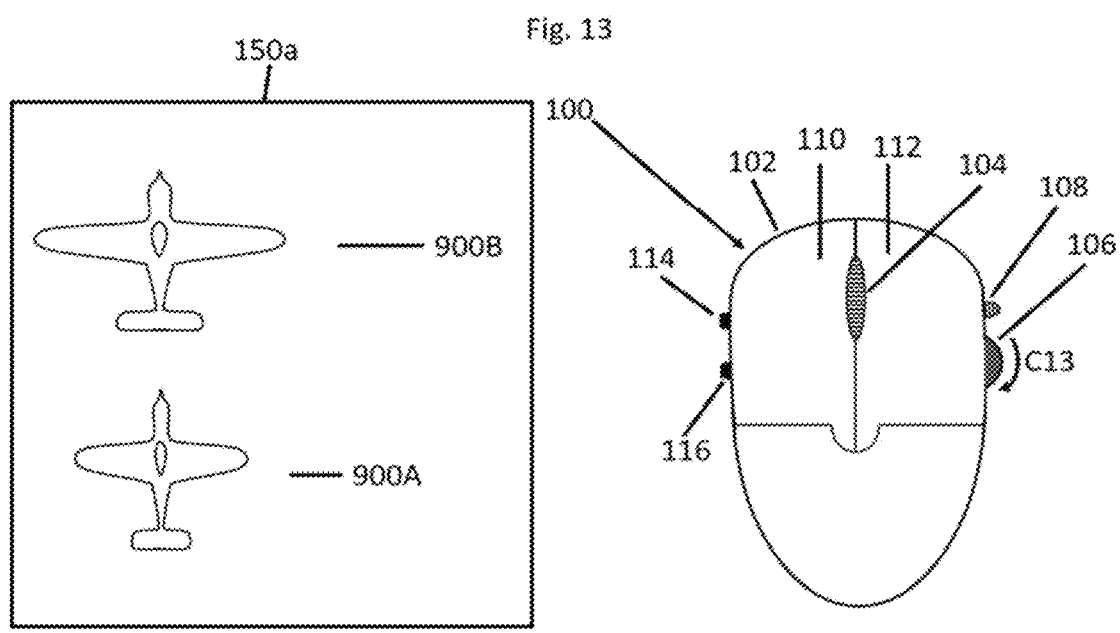
FIG. 13 shows a top view of the 3D mouse of FIG. 1 with a second side button of the 3D mouse of FIG. 1 pressed and an arrow representing rotation of a horizontal wheel of the 3D mouse of FIG. 1, which causes and an object to be resized accordingly.

FIG. 13 shows a top view of the 3D computer mouse 100 which may comprise a horizontal turn wheel 106, a resizing motion control button 116. FIG. 13 also shows top views of the same airplane object in two different sizes at 900A and 900B at the same location. As a user presses the resizing motion control Button 116 and simultaneously turns the horizontal turn wheel 106 in a clockwise C13 direction, the same airplane object keeps expanding in a lateral direction, such as from 900A to 900B while remaining at the same location. On the other hand, as a user presses the resizing motion control button 116 and simultaneously turns the horizontal turn Wheel 106 in anti-clockwise direction, the same airplane object keeps contracting in a lateral direction, such as from 900B to 900A while remaining at the same location, or substantially the same location with respect to its center of geometry.

Figure 14:
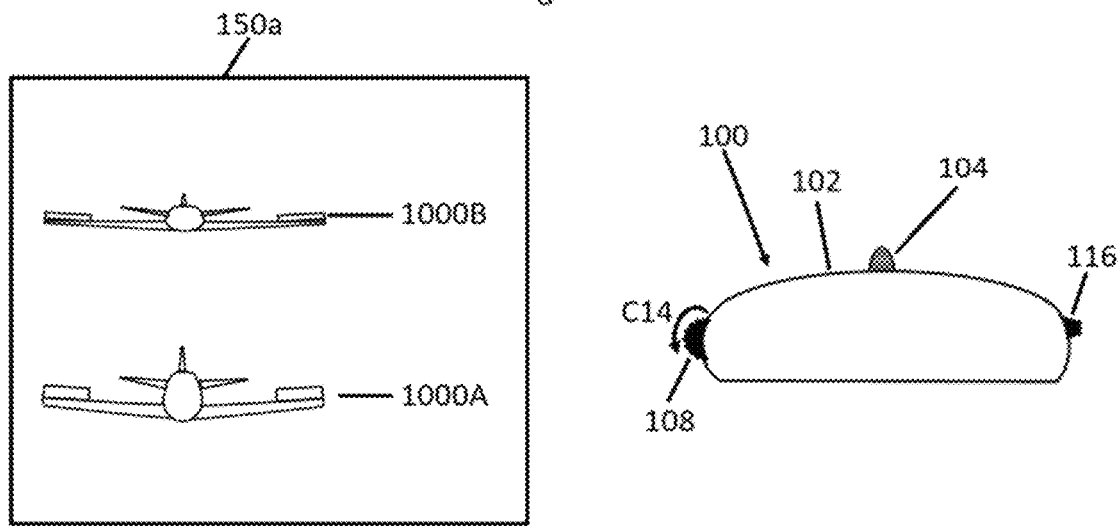
FIG. 14 shows a front view of the 3D mouse of FIG. 1, with a second side button of the 3D mouse of FIG. 1 pressed and an arrow representing rotation of a lateral vertical wheel of the 3D mouse of FIG. 1, which causes an object to be resized accordingly.

FIG. 14 shows a left view of the 3D computer mouse 100 which may comprise the lateral vertical turn wheel 108, and the resizing motion control button 116 and front views of an airplane object in two different sizes at 1000A and 1000B at the same location, or substantially the same location with respect to the center of geometry of the airplane object in FIG. 14. As a user presses the resizing motion control button 116 and simultaneously turns the lateral vertical turn Wheel 108 in a clockwise C14 direction, the same airplane object keeps contracting in a vertical direction, such as from 1000A to 10008, while remaining at the same location, or substantially the same location with respect to the center of geometry of the airplane in FIG. 14. On the other hand, as a user presses the resizing motion control button 116 and simultaneously turns the lateral vertical turn wheel 108 in anti-clockwise direction, the same airplane object in FIG. 14, keeps expanding in vertical direction, such as from 10008 to 1000A, while remaining at the same location In accordance with at least one embodiment of the present invention, the 3D computer mouse 100 can be designed and manufactured in many other ways than the one described above. The turn wheels 104, 106, and 108, press buttons 114 and 116 and finger pads 118, 120, and 122 can be modified to various shapes, or they can be combined in different ways. Also, the same functionality of the 3D computer mouse 100 can be achieved by various input control elements with different mechanisms.

In accordance with an embodiment of the present invention, the turn wheels 104, 106, and 108 and press buttons 114 and 116 can be replaced with small finger pads and the same functionality can be achieved. One advantage of using a finger pad is it will increase the life period of the 3D computer mouse 100. Another advantage with finger pads is rotation, translational motion and resizing in different directions can be achieved simultaneously as a user can move his finger on a finger pad in two mutually perpendicular directions.

Figure 15:
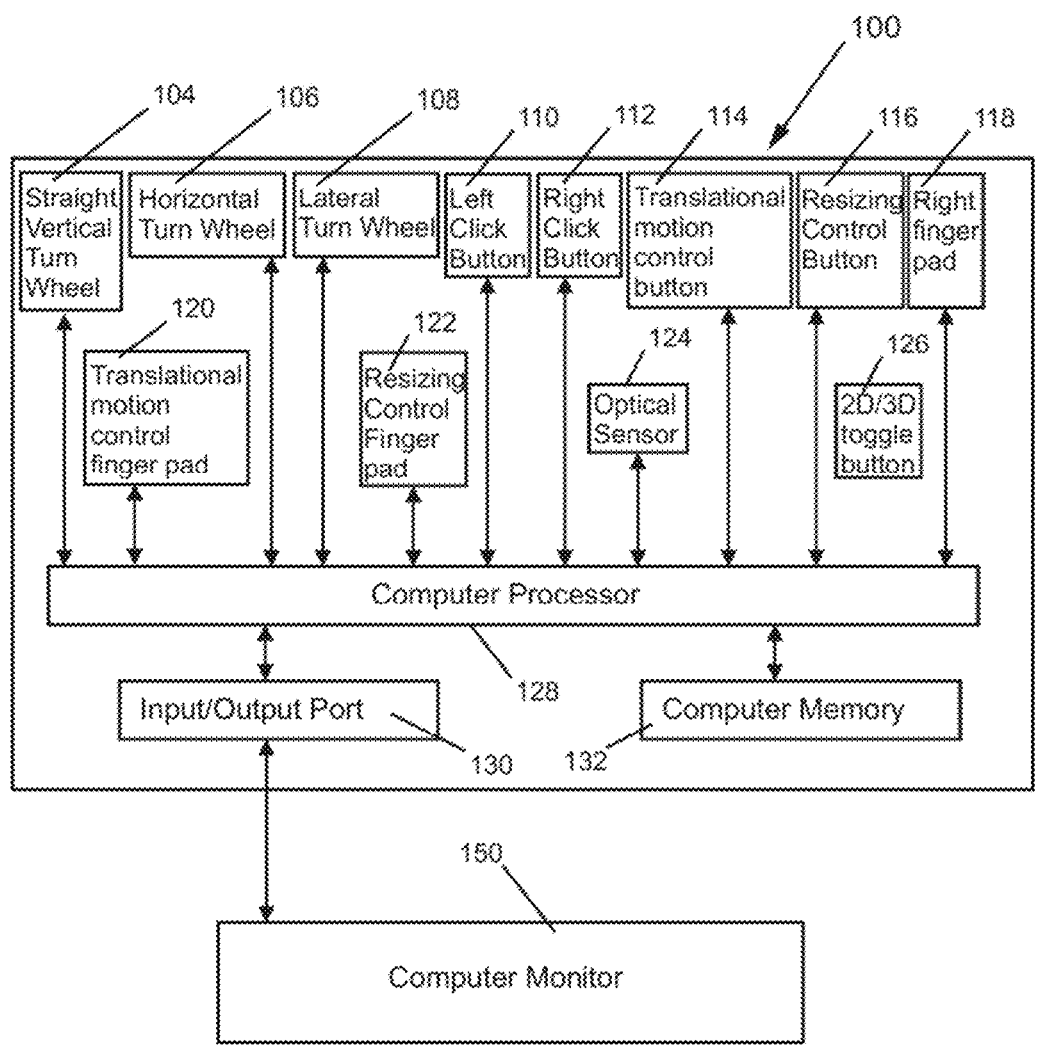
FIG. 15 shows a block diagram of various components of the 3D computer mouse of FIG. 1, along with a simplified block diagram of a computer monitor.

FIG. 15 shows a simplified block diagram of various components of the 3D computer mouse 100 along with a simplified block diagram of a computer monitor 150. The computer mouse 100 may include the straight vertical turn wheel 104, the horizontal turn wheel 106, the lateral turn wheel 108, the left click button 110, the right click button 112, the translational motion control button 114, the resizing control button 116, the right finger pad 118, the translational motion control finger pad 120, the resizing control finger pad 122, the optical sensor 124, and the 2D/3D toggle button 126 as previously described, which may be connected to and located in or on the computer mouse housing 102. The 3D computer mouse 100 may also include a computer processor 128, a computer memory 132, and an input/output port 130 which may be located in or on the computer housing 102.

The components 104, 106, 108, 110, 112, 114, 116, 118, 120, 122, 124, 126, 130, and 132 typically communicate with the computer processor 128 by a communications link, such as by electrical connection, hardwire connection, optical communications, and/or any other known communications link.

In operation, one or more signals are provides from one or more of components 104 106, 108, 110, 112, 114, 116, 118, 120, 122, 124, 126, and these signals are analysed by the computer processor 128 in accordance with computer software stored in computer memory 132, and the computer processor 128 then provides one or more signals to the computer monitor 150 to cause movement of a visual or virtual object on a the computer monitor 150. For example, a signal from straight vertical turn wheel 104 may indicate clockwise movement of wheel 104 with respect to housing 102, and would then cause the computer processor 128 to provide one or more signals via input/output port 130 to computer monitor 150 to cause movement of a visual of virtual object on computer monitor 150.

In at least one embodiment of the present invention a visual or virtual object moves in a simulated three dimensional space on a screen of the computer monitor 150. I.e. the screen of the monitor 150 is typically two dimensional a visual or virtual object, such as the objects at 202A-B, 302A-B, 402A-B, 502A-B, 600A-B, 700A-B, 802A-B, 900A-B, and 1000A-B, appear to move in a three dimensional manner as controller by the 3D computer mouse 100 in accordance with one or more embodiments of the present invention.

FIG. 16 shows a front view of a cone 1200 hiding behind a cylinder 1100. The cone 1200 and cylinder 1100 are visual objects represented on a computer screen of a computer monitor. The cone 1200 is not completely visible as its view is blocked by the cylinder 1100 in the front. The view or image of the cone 1200 and cylinder 1100 in FIG. 16 is typically on a two dimensional computer screen of a computer monitor.

FIG. 17 shows a top view of the 3D computer mouse 100 which may comprise the horizontal turn wheel 106, the left click button 110 and the translational motion control button 114. FIG. 17 also shows front view of the cylinder 1100 and the cone 1200, in a different state from FIG. 16. In FIG. 16, the visual object cone 1200 was hiding behind the cylinder 1100. FIG. 17 also shows a vertical line 1300. In at least one embodiment, the computer mouse 100 is configured so that as a user turns the horizontal turn wheel 106 in a clockwise C17 direction while pressing the left click button 110 and the translational motion control button 114, both the cylinder 1100 and the cone 1200 keep rotating as a complete environment about the vertical line 1300 in clockwise direction C18 direction at the same height, without any relative displacement between the two. The rotation of wheel 106 with simultaneously pressing of the left click button 110 and the translational motion control button 114, as shown in block diagram form in FIG. 15, sends one or more signals to the computer processor 128, which based on computer programming in the computer memory 132 or in computer memory outside the computer mouse 100, determines that rotation of the visual objects 1200 and 1100 should be done. The computer processor 128 or a computer processor outside the mouse 100 use the one or more signals from wheel 106 and buttons 110 and 114 to supply appropriate signals to the computer monitor 150 to cause the images 1200 and 1100 to appear to rotate on a computer screen of the computer monitor 150. Similarly, one or more signals from components 104, 108, 110, 112, 114, 116, 118, 120, 122, 124, and 126, are analysed by the computer processor 128 or another computer processor outside the computer mouse 100, in accordance with programming in computer memory 132 or computer memory outside the mouse 100 to cause one or more signals to be generated by the computer processor 128 or one or more further computer processors outside the computer mouse 100 to cause visual object movements or changes to visual objects appearing on the computer screen of the computer monitor 150.

The third dimension or the third direction of the three-dimensional simulated space on the computer monitor 150 or computer screen of the computer monitor 150 will appear to be or be simulated to be exactly perpendicular to the screen of the computer monitor 150, if what is displayed on the screen of the computer monitor 150 is a straight pictorial view of objects. In this case, objects simulated to be moving back and forth in the third dimension on the monitor screen will appear to be increasing and reducing in size. On the other hand, if what is displayed on the monitor screen of the computer monitor 150 is a skewed pictorial view of objects, then visual objects simulated to be moving back and forth in the simulated third dimension or direction will be moving at an angle between the horizontal and vertical directions along with increasing and decreasing in size of the objects.

Further, in at least embodiment of the present invention, the computer mouse 100 is provided which is configured to move, rotate, and/or resize the entire environment of the pictorial view, as a whole, on the screen of the computer monitor 150, instead of individual objects on the monitor screen, as in the example of FIGS. 16-17. Environmental translation, rotation and resizing can be performed such as by holding down one or both the side press buttons 114 and 116 and one of the click buttons, such as either 110 or 112 while turning one or more of turn wheels 104, 106, or 108.

In environmental translation all visual objects on the computer screen of the computer monitor 150 keep moving in a vertical, horizontal or third dimensional direction depending upon which wheel of wheels 104, 106, and 108, a user is turning, while all the objects remain stationary with respect to one another. In environmental rotation all objects keep rotating in orbits about a vertical, horizontal or third dimensional direction or line depending upon which wheel of wheels 104, 106, or 108 a user is turning, while all the objects remain stationary to one another. In environmental resizing all objects keep moving closer or farther to one another in a vertical, horizontal or third dimensional direction depending upon which wheel of wheels 104, 106, or 108 a user is turning.

Environmental rotation in a given direction is configured to be performed such as by simultaneously pressing, for example, the translational motion control button 114 on the left surface and one of the click buttons 110 and 112 while turning a wheel of wheels 104, 106, and 108 accordingly. Environmental translation in a given direction is configured to be performed such as by simultaneously pressing the resizing control button 116 on the left surface and one of the click buttons 110 or 112 while turning a wheel of wheels 104, 106, and 108 accordingly. Environmental resizing in a given direction can be performed such as by simultaneously pressing both the press buttons 114 and 116 on the left surface and one of the click buttons of 110 and 112 while turning a wheel of wheels 104, 106, and 108 accordingly.

Note that all functions which the computer mouse 100 is able to perform to manipulate visual objects and/or environment on a computer screen, such as a computer screen of the computer monitor 150, may be programmed by computer software stored in computer memory 132 and/or some other computer memory outside of the computer mouse 100 and implemented by the computer processor 128 and/or one or more computer processors outside the computer mouse 100.

FIGS. 6-14, and 16-17 show a simplified diagram of a computer screen 150a of the computer monitor 150 shown in FIG. 15.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A computer mouse comprising
a housing;
a lateral vertical turn wheel attached to the housing on a side wall of the housing and configured to rotate with respect to the housing and in a first plane to control simulated lateral vertical planar rotation of a visual object on a two dimensional computer screen during a three dimensional mode of operation;
a horizontal turn wheel attached to the housing on a side wall of the housing and configured to rotate with respect to the housing and in a second plane which is perpendicular to the first plane to control simulated horizontal planar rotation of the visual object on the two dimensional computer screen during the three dimensional mode of operation; and
a straight vertical turn wheel attached to the housing on a top of the housing and configured to rotate with respect to the housing and in a third plane which is perpendicular to the first plane and the second plane to control rotation of the visual object on the computer screen in a vertical plane which appears on the computer screen to be substantially perpendicular to the two dimensional computer screen during the three dimensional mode of operation.

2. The computer mouse of claim 1 further comprising
a translational motion control button; and
wherein holding the translational motion control button down while rotating the lateral vertical turn wheel is configured to cause the visual object to move from one location to another on the two dimensional computer screen along a vertical line during the three dimensional mode of operation;
wherein holding the translational motion control button down while rotating the horizontal turn wheel is configured to cause the visual object to move from one location to another on the two dimensional computer screen along a horizontal line, which is perpendicular to the vertical line during the three dimensional mode of operation; and
wherein holding the translational motion control button down while rotating the straight vertical turn wheel is configured to cause the visual object to appear to move from one location to another in a direction which appears on the computer screen to be along a straight line, which appears to be substantially perpendicular to the vertical line and to the horizontal line, and substantially perpendicular to the two dimensional computer screen during the three dimensional mode of operation.

3. The computer mouse of claim 2 further comprising
a resizing motion control button; and
wherein holding the resizing motion control button down while rotating the lateral vertical turn wheel is configured to cause the visual object to expand or contract in size on the two dimensional computer screen along a vertical line during the three dimensional mode of operation;
wherein holding the resizing motion control button down while rotating the horizontal turn wheel is configured to cause the visual object to expand or contract in size along a horizontal line on the two dimensional computer screen, which is perpendicular to the vertical line during the three dimensional mode of operation;
wherein holding the resizing motion control button down while rotating the straight vertical turn wheel is configured to cause the visual object to expand or contract in size on the two dimensional computer screen in a manner which appears to be along a straight line, which appears to be perpendicular to the vertical line and to the horizontal line, and substantially perpendicular to the two dimensional computer screen during the three dimensional mode of operation;
and wherein each of the resizing control button and the translational motion control button is attached on a side wall of the housing.

4. The computer mouse of claim 3 wherein
the resizing control button and the translational motion control button are attached to the same side wall of the housing.

5. The computer mouse of claim 1 further comprising
a resizing motion control button; and
wherein holding the resizing motion control button down while rotating the lateral vertical turn wheel is configured to cause the visual object to expand or contract in size on the two dimensional computer screen along a vertical line during the three dimensional mode of operation;
wherein holding the resizing motion control button down while rotating the horizontal turn wheel is configured to cause the visual object to expand or contract in size along a horizontal line on the two dimensional computer screen, which is perpendicular to the vertical line during the three dimensional mode of operation; and
wherein holding the resizing motion control button down while rotating the straight vertical turn wheel is configured to cause the visual object to expand or contract in size on the two dimensional computer screen in a manner which appears to be along a straight line, which appears to be perpendicular to the vertical line and to the horizontal line, and substantially perpendicular to the two dimensional computer screen during the three dimensional mode of operation.

6. The computer mouse of claim 1 further comprising
means for changing between a two dimensional mode operation of the computer mouse and the three mode dimensional operation of the computer mouse.

7. The computer mouse of claim 1 wherein
the lateral vertical turn wheel and the horizontal turn wheel are attached to the housing on the same side wall of the housing.

8. The computer mouse of claim 1 further comprising
a toggle button, which is attached to the housing, and which is configured to toggle the computer mouse between a two dimensional mode of operation and the three dimensional mode of operation.

9. The computer mouse of claim 8 wherein
when the computer mouse is in the two dimensional mode operation, the straight vertical turn wheel is configured to be used to scroll on the computer screen.

10. A method comprising
controlling vertical direction movement of a visual object on a two dimensional computer screen based at least in part on rotation of a lateral vertical turn wheel attached to a housing of a computer mouse on a side wall of the housing during the a three dimensional mode of operation;
controlling horizontal direction movement of a visual object on the two dimensional computer screen based at least in part on rotation of a horizontal turn wheel attached to the housing of the computer mouse on a side wall of the housing during the three dimensional mode of operation;

and controlling movement of a visual object in a direction on the two dimensional computer screen, which is simulated to appear to be substantially perpendicular to vertical and horizontal directions, and substantially perpendicular to the two dimensional computer screen based at least in part on rotation of a straight vertical turn wheel attached to the housing of the computer mouse on a top of the housing during the three dimensional mode of operation.

11. A method comprising rotating a lateral vertical turn wheel, which is attached to a housing of a computer mouse on a side wall of the housing and configured to rotate with respect to the housing and in a first plane to control simulated lateral vertical planar rotation of a visual object on a two dimensional computer screen during a three dimensional mode of operation;

rotating a horizontal turn wheel, which is attached to the housing of the computer mouse on a side wall of the housing and configured to rotate with respect to the housing and in a second plane which is perpendicular to the first plane to control simulated horizontal planar rotation of the visual object on the two dimensional computer screen during the three dimensional mode of operation; and rotating a straight vertical turn wheel, which is attached to the housing of the computer mouse on a top of the housing and configured to rotate with respect to the housing and in a third plane which is perpendicular to the first plane and the second plane to control simulated rotation of the visual object on the two dimensional computer screen in a plane which appears on the computer screen to be substantially perpendicular to lateral vertical and horizontal planes during the three dimensional mode of operation.

12. The method of claim 11 further comprising holding the translational motion control button down while rotating the lateral vertical turn wheel to cause the visual object to move from one location to another along a vertical line on the two dimensional computer screen during the three dimensional mode of operation;

holding the translational motion control button down while rotating the horizontal turn wheel to cause the visual object to move from one location to another along a horizontal line, which is perpendicular to the first vertical line, on the two dimensional computer screen during the three dimensional mode of operation; and holding the translational motion control button down while rotating the straight vertical turn wheel to cause the visual object to be simulated to move from one location to another in a direction which appears on the two dimensional computer screen to be along a straight line, which appears to be substantially perpendicular to the vertical line and to the horizontal line, and substantially perpendicular to the two dimensional computer screen during the three dimensional mode of operation.

13. The method of claim 12 further comprising a resizing motion control button; and wherein holding the resizing motion control button down while rotating the lateral vertical turn wheel is configured to cause the visual object to expand or contract in size on the two dimensional computer screen along a vertical line during the three dimensional mode of operation;

wherein holding the resizing motion control button down while rotating the horizontal turn wheel is configured to cause the visual object to expand or contract in size along a horizontal line on the two dimensional computer screen, which is perpendicular to the vertical line during the three dimensional mode of operation;

wherein holding the resizing motion control button down while rotating the straight vertical turn wheel is configured to cause the visual object to expand or contract in size on the two dimensional computer screen in a manner which appears to be along a straight line, which appears to be perpendicular to the vertical line and to the horizontal line, and substantially perpendicular to the two dimensional computer screen during the three dimensional mode of operation;

and wherein each of the resizing control button and the translational motion control button is attached on a side wall of the housing.

14. The method of claim 13 wherein the resizing control button and the translational motion control button are attached to the same side wall of the housing.

15. The method of claim 11 further comprising holding a resizing motion control button down while rotating the lateral vertical turn wheel to cause the visual object to expand or contract in size along a vertical line, on the two dimensional computer screen during the three dimensional mode of operation;

holding the resizing motion control button down while rotating the horizontal turn wheel is configured to cause the visual object to expand or contract in size along a horizontal line, which is perpendicular to the vertical line, on the two dimensional computer screen during the three dimensional mode of operation; and holding the resizing motion control button down while rotating the straight vertical turn wheel is configured to cause the visual object to appear to expand or contract in size on the computer screen in a manner which appears to be along a straight line, which appears to be perpendicular to the vertical line and to the horizontal line, and perpendicular to the two dimensional computer screen during the three dimensional mode of operation.

16. The method of claim 11 further comprising changing between a two dimensional mode of operation and the three dimensional mode of operation.

17. The method of claim 11 wherein the lateral vertical turn wheel and the horizontal turn wheel are attached to the housing on the same side wall of the housing.

18. The method of claim 11 further comprising using a toggle button, which is attached to the housing, to toggle the computer mouse between a two dimensional mode of operation and the three dimensional mode of operation.

* * * * *